United States Patent [19]

Prochazka

[11] 3,993,602
[45] Nov. 23, 1976

[54] POLYCRYSTALLINE SILICON CARBIDE WITH INCREASED CONDUCTIVITY

[75] Inventor: Svante Prochazka, Ballston Lake, N.Y.

[73] Assignee: General Electric Company, Schenectady, N.Y.

[22] Filed: Nov. 17, 1975

[21] Appl. No.: 632,495

[52] U.S. Cl. .............................. 252/504; 252/516; 106/44; 264/104; 264/105
[51] Int. Cl.[2] .......................................... H01B 1/04
[58] Field of Search ............ 252/504, 516; 264/104, 264/105; 106/44

[56] References Cited
UNITED STATES PATENTS

| | | |
|---|---|---|
| 2,907,972 | 10/1959 | Schildhauer et al. ................ 252/516 |
| 2,916,460 | 12/1959 | Vanderbeck, Jr. ................ 252/516 |
| 3,205,080 | 9/1965 | Ryshkewitch ........................ 106/44 |
| 3,954,483 | 5/1976 | Prochazka ............................ 106/44 |

*Primary Examiner*—Benjamin R. Padgett
*Assistant Examiner*—E. Suzanne Parr
*Attorney, Agent, or Firm*—Jane M. Binkowski; Joseph T. Cohen; Jerome C. Squillaro

[57] ABSTRACT

Polycrystalline silicon carbide with increased electrical conductivity at room temperature is produced by shaping a particulate mixture of $\beta$-silicon carbide, boron additive, beryllium carbide and a carbonaceous additive into a green body and sintering the body producing a sintered body having a density of at least about 85% of the theoretical density of silicon carbide.

4 Claims, 1 Drawing Figure

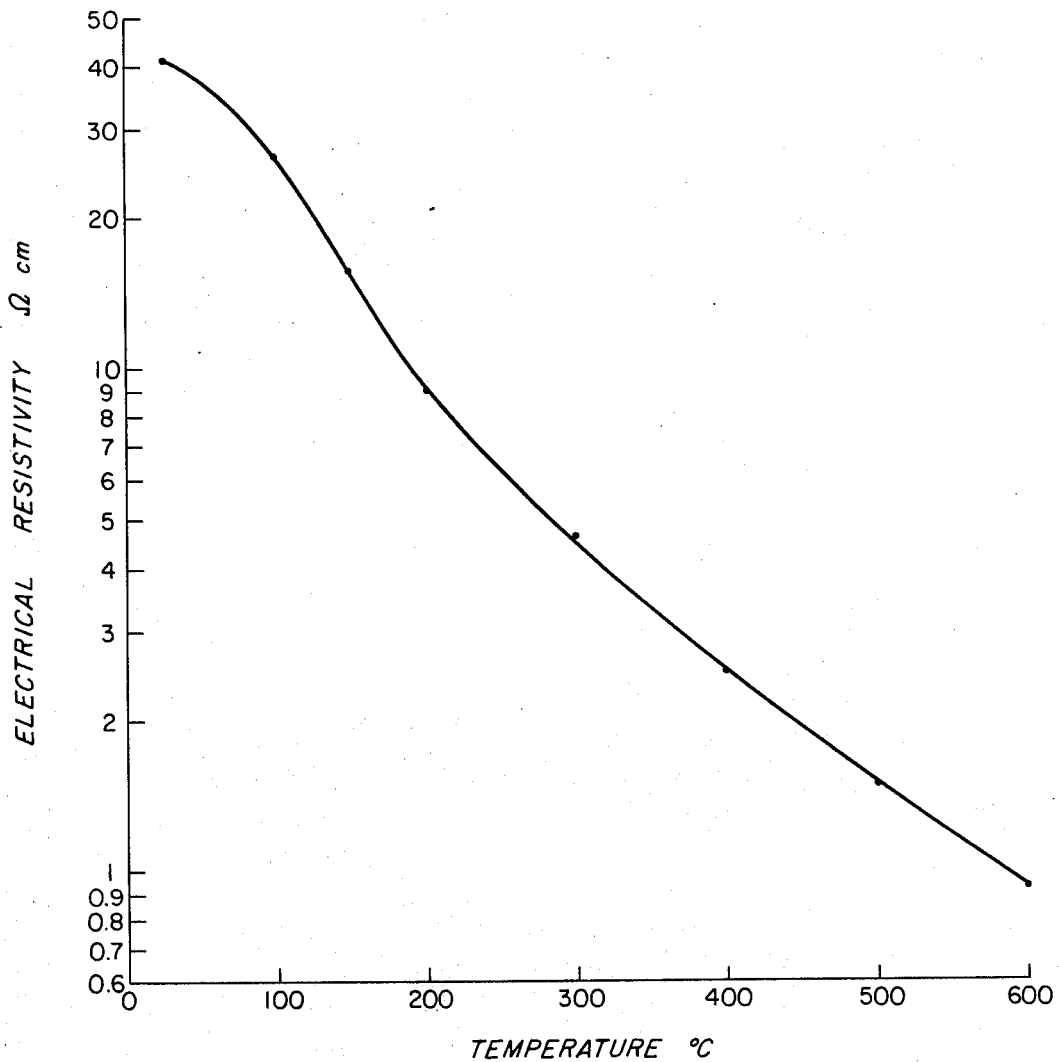

POLYCRYSTALLINE SILICON CARBIDE WITH INCREASED CONDUCTIVITY

The invention herein described was made in the course of or under a contract or subcontract thereunder (or grant) with the Department of the Navy.

It has been known that boron introduces defects (acceptor levels) in the lattice of a SiC single crystal which result in P-type conductivity. The electrical conductivity varies with temperature and with the concentration of the dopant. The room temperature electrical conductivity of boron doped SiC is low. Typical room temperature resistivity at a boron level of about 0.3% is $10^4 \Omega$cm which is too high for the material to be applicable for instance for thermoelectric devices, conductors, heaters, etc. Doping of SiC with aluminum also introduces defects and a P-type conductivity, but the electrical behavior including room temperature conductivity is also similar. The effect of other dopants on the electronic properties of SiC single crystals have been also investigated by the ion implantation technique. Generally, trivalent atoms such as La, Y exhibit similar effects as Al and B.

In my copending application. Ser. No. 409,073, filed Oct. 24, 1973, now abandoned in favor of continuation-in-part application Ser. No. 679,207, filed Apr. 22, 1976, there is disclosed a sintering process comprising forming a mixture of submicron powder composed of silicon carbide, a boron additive and free carbon, shaping the mixture into a green body and sintering the green body in an atmosphere in which it is substantially inert at a sintering temperature of about 1900° – 2100° C to produce a sintered polycrystalline silicon carbide body having a density of at least 85%. This boron-containing SiC sintered body has an electrical conductivity which is too low at temperatures ranging from about room temperature to 400° C to make it useful as a conductor. For example, at room temperature it has a conductivity of the order of about $2 \times 10^{-4} \Omega^{-1}$ cm$^{-1}$ which corresponds to a resistivity of $0.5 \times 10^4 \Omega$cm.

In accordance with the present invention, beryllium carbide is added to the silicon carbide particulate mixture in the sintering process to substantially enhance the low temperature electrical conductivity of the sintered body. In addition, the beryllium carbide acts in conjunction with the boron additive to consolidate the silicon carbide particulate compact into a dense body at a temperature significantly lower than that required when no beryllium carbide is used.

Those skilled in the art will gain a further and better understanding of the present invention from the detailed description set forth below, considered in conjunction with the figure accompanying and forming a part of the specification which is a graph showing how the electrical resistivity $\Omega$cm of the present polycrystalline silicon carbide body varies with temperature.

Briefly stated, the process of the present invention comprises providing a significantly uniform particulate dispersion or mixture, wherein the particles are submicron in size, of $\beta$-silicon carbide, beryllium carbide, boron additive and a carbonaceous additive which is free carbon or a carbonaceous organic material which is heat-decomposible to produce free carbon, shaping the mixture into a green body, and sintering the green body at a temperature ranging from 1850° C to 2300° C in an atmosphere in which the green body and resulting sintered body are substantially inert to produce a sintered body having a density of at least 85% of the theoretical density of silicon carbide.

In carrying out the present process, a significantly uniform and preferably a substantially uniform particulate mixture of silicon carbide, beryllium carbide, boron additive and carbonaceous additive is prepared and shaped into a green body. Specifically, the silicon carbide powder consists essentially of the $\beta$-phase and less than 1% by weight of the $\alpha$-phase. The phases are readily determined by standard procedures. Amounts of the $\alpha$-phase in excess of 1% by weight usually coarsen the structure of the body significantly during sintering preventing densification and the production of a sintered body having a density of at least 85%. For best results single phase $\beta$-silicon carbide powder is used.

It is essential that the powder or particles in the mixture be submicron in size in order to obtain high densities and strengths upon sintering. Silicon carbide powder of submicron size can be prepared by a number of techniques as, for example, by direct synthesis from the elements, by reduction of silica, or by pyrolysis of compounds containing silicon and carbon.

A number of processes which involve the pyrolysis of compounds containing silicon and carbon are particularly advantageous since they can be controlled to produce $\beta$-silicon carbide of desired submicron particle size composed mainly of isolated crystallites. Also, these pyrolytic processes can be controlled to produce a carbon-rich silicon carbide powder, e.g. a free carbon-containing $\beta$-silicon carbide powder. If such a powder contains the required amount of free carbon of submicron size uniformly distributed therein, it is particularly useful in the present process since it eliminates the separate step of introducing free carbon.

The boron additive in the powder mixture from which the green body is shaped is in the form of elemental boron or boron carbide. In order to obtain significant densification during sintering, the amount of boron additive is critical and is equivalent to about 0.3% to 3.0% by weight of elemental boron based on the amount of silicon carbide, e.g. 0.3 part by weight to 3 parts by weight of elemental boron based on 100 parts by weight of silicon carbide. The particular amount of boron additive used is determinable empirically and depends largely on the degree of dispersion achieved in the mixture since the more thoroughly it is dispersed the more uniform is the density of the sintered product. However, amounts of elemental boron below 0.3% by weight do not result in the necessary degree of densification whereas amounts of elemental boron greater than 3.0% by weight produce no significant additional densification and may deteriorate the oxidation resistance of the product. During sintering, the boron additive enters into solid solution with the silicon carbide. In addition, generally when amounts of the additive in excess of that equivalent to about 1% by weight of elemental boron are used, a boron carbide phase is also produced in the form of very fine grains in the sintered product which generally range up to about 2 microns in size but which are always smaller than the surrounding silicon carbide grains.

In the present process beryllium carbide, Be$_2$C, is used in an amount ranging from about 0.1% by weight to 1.5% by weight of the silicon carbide. Amounts of beryllium carbide in excess of 1.5% by weight do not provide any advantage. The Be$_2$C should be of submicron size, and preferably, to promote its dispersibility in the silicon carbide particles, it should have an average particle size the same as, or preferably, finer than that of the silicon carbide. The particular amount of beryllium carbide used is determinable empirically. The beryllium carbide particles undergo no substantial change in size during sintering.

The carbonaceous additive is used in an amount equivalent to 0.1% by weight to 1.0% by weight of free carbon based on the amount of silicon carbide, e.g., 0.1 part by weight to 1.0 part by weight of free carbon based on 100 parts by weight of silicon carbide. Specifically, the carbonaceous additive is particulate free carbon of submicron size such as, for example, acetylene black, or a carbonaceous organic material which is heat-decomposible to produce particulate free carbon of submicron size in the required amount. In addition, the carbonaceous organic material is a solid or liquid at room temperature and completely decomposes at a temperature in the range of about 50° C to 1000° C to yield free carbon and gaseous products of decomposition. Also, the carbonaceous organic material is one which has no significant deteriorating effect on the silicon carbide, boron additive, beryllium carbide or the resulting sintered product.

In order to obtain satisfactory densification, the oxygen content of the silicon carbide powder should be less than about 1.0 weight percent, and preferably less than 0.2 weight percent. Such oxygen is determinable by standard techniques and generally, it is present largely in the form of silica.

The function of free carbon is to reduce silica which always is present in silicon carbide powders in small amounts or which forms on heating from oxygen adsorbed on the powder surfaces. Carbon then reacts during heating with the silica according to the reaction: $SiO_2 + 3C = SiC + 2CO$. Silica, when present in the SiC powders in appreciable amounts, halts densification of silicon carbide completely so that little or no shrinkage is obtained.

There is an additional role of the free carbon. It will act as a getter for free silicon if present in the powders or if it is formed by the following reaction during heating up to the sintering temperature: $SiO_2 + 2SiC = 3Si + 2CO$. The presence of silicon, just as the silica, tends to halt or retard densification of SiC and must be eliminated. The specific amount of free carbon required depends largely upon the oxygen content in the starting SiC powder. A substantial excess of particulate free carbon beyond the necessary amount for deoxidation of the SiC is harmful since it functions much like permanent pores in the sintered SiC body thereby limiting the ultimate achievable density and strength. Systematic experiments have shown that 0.1 to 1.0 weight percent of free carbon is sufficient to provide sinterability.

The silicon carbide, beryllium carbide, boron additive and free carbon in the form of submicron powder can be admixed by a number of conventional techniques and under conditions which have no significant deteriorating effect on their properties such as, for example, jet milling in a dry inert atmosphere or ball milling in a liquid dispersion.

In carrying out the present process, the carbonaceous organic material used as the source of free carbon can be introduced by a number of techniques and heat-decomposed before or after the green body is formed. If the carbonaceous organic material is a solid, it is preferably admixed in the form of a solution with the silicon carbide powder, boron additive and beryllium carbide to substantially coat the particles. The wet mixture can then be treated to remove the solvent, and the resulting dry mixture can be heated to decompose the carbonaceous organic material producing free carbon in situ before the mixture is formed into a green body. If desired, the wet mixture can be formed into a green body and the solvent removed therefrom. In this way, a substantially uniform coating of the organic material on the silicon carbide powder is obtained which on decomposition produces a uniform distribution of free carbon. The green body is then heated to decompose the carbonaceous organic material to produce free carbon in situ and diffuse away gaseous products of decomposition. The solvent can be removed by a number of techniques such as by evaporation. Likewise, if the carbonaceous organic material is a liquid, it can be admixed with the silicon carbide powder and other components, and the wet mixture heated to decompose the organic material and form free carbon, or the wet mixture can be formed into a green body which is then heated to decompose the organic material to form free carbon in situ and diffuse away gaseous products of decomposition. The heat-decomposition of the carbonaceous organic material should be carried out in an atmosphere in which the components being heated are substantially inert or which has no significant deteriorating effect on the components being heated such as argon or a vacuum. Preferably, the carbonaceous organic material in the green body is heat-decomposed in the sintering furnace as the temperature is being raised to sintering temperature.

High molecular weight aromatic compounds are the preferred carbonaceous organic materials for making the carbon addition since they ordinarily give on pyrolysis the required yield of particulate free carbon of submicron size. Examples of such aromatic compounds are a phenolformaldehyde condensate resin which is soluble in acetone, as well as condensate polymers of resorcinol-formaldehyde, aniline-formaldehyde, and cresol-formaldehyde. A preferred group of carbonaceous additives are polymers of aromatic hydrocarbons such as polyphenylene or polymethylphenylene which are soluble in aromatic hydrocarbons and yield on heat-decomposition up to 90% of free carbon.

A number of techniques can be used to shape the powder mixture into a green body. For example, the powder mixture can be extruded, injection molded, die-pressed isostatically pressed or slip cast to produce the green body of desired shape. Any lubricants, binders or similar materials used in shaping the powder mixture should have no significant deteriorating effect on the properties of the components of the green body or the resulting sintered body. Such materials are preferably of the type which evaporate on heating at relatively low temperatures, preferably below 200° C, leaving no significant residue. The green body, preferably, should have a density of at least 45% of the theoretical density for silicon carbide to promote densification during sintering and achieve attainment of the desired density of at least 85%.

Sintering of the green body is carried out in an atmosphere in which it is substantially inert, i.e. an atmosphere which has no significant deteriorating effect on its properties such as, for example, argon, helium or a vacuum. The sintering atmosphere can range from a substantial vacuum to atmospheric pressure, but as a practical matter, it is preferably at atmospheric pressure.

Sintering is carried out at a temperature ranging from about 1850° C to about 2300° C, and preferably, from 1850° C to 2100° C. The particular sintering temperature is determinable empirically and depends largely on particle size, density of the green body, and final density desired in the sintered product with higher final densities requiring higher sintering temperatures. Specifically, the smaller the size of the particles in the green body and the higher its density, the lower is the required sintering temperature. Sintering temperatures lower than 1850° C do not produce the present sintered bodies with a density of at least 85%. Sintering temperatures higher than 2100° C provide no advantage and cause excessive grain growth which may affect the mechanical properties of the sintered product detrimentally but not electrical properties. However, sintering temperatures higher than 2300° C bring about evaporation of silicon carbide.

The polycrystalline sintered body of the present invention has a density ranging from 85% to about 100% of the theoretical density of silicon carbide. The product is composed of silicon carbide, beryllium carbide, boron or boron carbide, and free elemental carbon.

The boron is present in the sintered body in an amount ranging from 0.3% by weight to 3% by weight based on the silicon carbide. The boron is in solid solution with the silicon carbide and also may be present as a boron carbide phase in the form of fine grains. The boron or boron and boron carbide are substantially uniformly distributed throughout the sintered body.

The beryllium carbide in the sintered product is present in an amount ranging from 0.1% by weight to 1.5% by weight based on the silicon carbide. A minor portion of the beryllium carbide is in solid solution with the silicon carbide and the remainder is present as grains of beryllium carbide which are distributed at least significantly uniformly through the sintered body. The extent of the beryllium carbide solution depends on sintering temperature and it is determinable by techniques such as, for example, chemical analysis or by electron microprobe. The amount of beryllium carbide in solid solution ranges up to about 0.03% by weight of silicon carbide.

The free carbon in the sintered product is in the form of particles, substantially submicron in size, which are significantly uniformly distributed throughout the sintered body. The particles of free carbon do not change in size significantly during sintering.

The sintered product of the present invention has a SiC composition and microstructure which is determined largely by sintering temperature. Specifically, at lower sintering temperatures, the SiC content of the sintered product consists of $\beta$-SiC and has a substantially uniform microstructure with a grain size ranging up to about 10 microns and an average grain size of about 3 microns. However, with increasing sintering temperature, it appears that the beryllium carbide promotes conversion of $\beta$-SiC to $\alpha$-SiC so that the SiC content of the product can consist of a mixture of $\beta$-SiC and $\alpha$-SiC where the $\beta$-SiC is in the form of a fine grain phase with a grain size ranging up to about 10 microns and $\alpha$-SiC is in the form of large platelets or tabular crystals up to several hundred microns long. At still higher sintering temperatures, the $\beta$-SiC transforms entirely to $\alpha$-SiC with a microstructure of large tabular crystals several millimeters long.

The sintered body of the present invention has an electrical conductivity in air at room temperature of at least about 0.01 ohm$^{-1}$ cm$^{-1}$ which is equivalent to a resistivity ranging up to 100 ohm cm. Typically, it has a room temperature conductivity in air in the range of 0.1$\Omega^{-1}$ cm$^{-1}$ to 0.02$\Omega^{-1}$ cm$^{-1}$. The present sintered product also has a negative temperature coefficient of resistivity which indicates that its electrical resistivity decreases with increasing temperature which means that its electrical conductivity increases with increasing temperature. In addition, the present product exhibits a P-type conductivity.

The present invention makes it possible to fabricate complex shaped articles of polycrystalline silicon carbide ceramic directly which heretofore could not be manufactured or required expensive and tedious machining because of the hardness of the material. The present sintered product can be made in the form of a useful complex shaped article, such as an impervious crucible, a thin walled tube, a long rod, a spherical body, or a hollow shaped article. Specifically, the dimensions of the present sintered product differ from those of its green body by the extent of shrinkage, i.e. densification, which occurs during sintering. Also, the surface characteristics of the sintered body depend on those of the green body from which it is formed, i.e. it has a substantially smooth surface if the green body from which it is formed has a smooth surface. The present sintered product is useful as a resistor, a temperature sensor for a wide temperature ranging from −100° C to 1700° C in air and up to 2000° C in an inert atmosphere, and a high temperature heating element.

The invention is further illustrated by the following examples.

EXAMPLE 1

A carbon-rich silicon carbide powder prepared by a pyrolytic process was used. Specifically, it was submicron powder composed of $\beta$-silicon carbide with free carbon uniformly and intimately dispersed therein. The powder was analyzed and the following results were established:

|  | (% by weight) |
| --- | --- |
| Total carbon | 29.6% |
| Free carbon | 0.7% |
| Boron | <0.005% |
| Oxygen | 0.08% |
| Fe | 0.004% |
| W | 0.009% |
| Al | <0.001% |
| Specific surface area | 8 m²/g |
| Mean average particle size | 0.24 $\mu$ |
| Specific weight | 3.20 g/cc |
| Polytype composition by X-rays | $\beta$-SiC |

This powder contained cubic ($\beta$)-SiC with no other SiC polytypes detectable by X-ray diffraction analysis.

50 g of this powder and 0.5 g of beryllium carbide (Be$_2$C) of submicron particle size were vibrationally milled dispersed in benzene in a plastic jar by 3 mm diameter cemented carbide balls. The solvent was evaporated in vacuum and the resulting significantly uniform powder mixture was pressed into 12 mm diameter cylindrical green bodies which had a density of 1.75 g/cc or 54% of the theoretical density of silicon carbide.

The green bodies were sintered in a carbon resistor furnace in an atmosphere of 1 Torr of flowing tank quality argon at a temperature of 2050° C for 15 minutes. The cylinders shrunk 11.5% and their final bulk density was 2.58 g/cc corresponding to 80.5% of the theoretical density. Electrical resistance measured at room temperature along a 1 cm length of one of the sintered cylinders was about 40Ω. This example shows that the use of beryllium carbide alone does not densify the silicon carbide to the desired density but it does impart to the sintered product good electrical conductivity at room temperature.

EXAMPLE 2

In this example the effect of boron on silicon carbide was determined.

The silicon carbide powder used in this example was the same as that used in Example 1. 50 g of this silicon carbide powder and elemental boron of submicron size in an amount of 0.36% by weight of the silicon carbide powder were formed into a powder mixture, pressed into 12 mm diameter cylindrical green bodies and sintered as set forth in Example 1, but at the sintering temperatures shown in Table I. The results are shown in Table I.

TABLE I

| Run No. | Sintering Temp. ° C | Bulk Density g/cc | Fractional Density % | Resistivity In Air At Room Temp. Ωcm | Degree of β to α Conversion % |
|---|---|---|---|---|---|
| A | 1950 | 2.67 | 83.1 | n.d. | 0 |
| B | 2000 | 2.89 | 90.0 | 9 × 10³ | 0 |
| C | 2080 | 3.06 | 95.3 | 5 × 10³ | 0 |
| D | 2180 | 3.12 | 97.2 | 5.8 × 10³ | 74 |

Table I shows that although satisfactory densities are attained with boron, the electrical resistivities of the sintered products at room temperature are too high to be useful for most applications.

EXAMPLE 3

This example illustrates the use of beryllium carbide and elemental boron with silicon carbide.

The silicon carbide powder used in this example was the same as that used in Example 1. 50 g of this silicon carbide powder, elemental boron of submicron size in an amount of 0.36% by weight of the silicon carbide powder, and $Be_2C$ of submicron size in an amount of 1% by weight of the silicon carbide powder were formed into a powder mixture, pressed into 12 mm diameter cylindrical green bodies and sintered as set forth in Example 1 but at the sintering temperatures shown in Table II.

The results are shown in Table II.

TABLE II

| Run No. | Sintering Temp. ° C | Bulk Density g/cc | Fractional Density % | Resistivity In Air At Room Temp. Ωcm | Degree of β to α Conversion % |
|---|---|---|---|---|---|
| E | 1800 | 2.37 | 73.8 | n.d. | n.d. |
| F | 1870 | 2.98 | 92.8 | 56 | 27 |
| G | 1950 | 2.99 | 93.1 | 41 | n.d. |
| H | 2080 | 2.93 | 91.3 | 23 | 100 |

Runs F, G and H of Table II illustrate the present invention. Specifically, Run G shows that at a temperature of 1950° C a sintered product having a density of 93.1% is attainable which is much higher than that produced at a temperature of 1950° C in Run A of Example 2 where no beryllium carbide was used. Also, the electrical resistivities of Runs F, G and H are significantly lower than those of Runs B, C and D where no beryllium carbide was used.

EXAMPLE 4

A portion of the powder mixture prepared in Example 3 was used in the example. It was pressed into a green body in the form of a rod 0.5 cm × 0.5 cm × 3.2 cm. and sintered as set forth in Example 1 but at a sintering temperature of 1950° C.

The sintered rod had a final bulk density of 2.99 g/cc corresponding to 93.1% of theoretical density of silicon carbide.

The electrical resistivity of the rod was measured in air as a function of temperature at temperatures ranging from room temperature to 600° C silver electrodes and a four contact technique using 6 VDC. The results are shown in the accompanying FIGURE.

The FIGURE shows that with increasing temperature its electrical resistivity decreases having a temperature coefficient of resistivity $-0.02\Omega/°$ C.

EXAMPLE 5

The type of conductance of the present sintered product was determined by comparing the polarity of the thermoelectrical current of a carbon-N-type SiC (nitrogen doped) couple and a couple of the present SiC product. The polarity was reversed indicating P-type conductivity.

In copending U.S. patent application Ser. No. 632,496 entitled "Dense Sintered Boron Carbide" filed of even date herewith in the name of Svante Prochazka and assigned to the assignee hereof, there is disclosed a polycrystalline boron carbide sintered body containing beryllium carbide with a density ranging from 85% to 96% of the theoretical density of boron carbide and having a uniform microstructure of equiaxed grains.

In copending U.S. patent application Ser. No. 632,481 entitled "Hot Pressed Silicon Carbide Containing Beryllium Carbide" filed of even date herewith in the name of Svante Prochazka and assigned to the assignee hereof, there is disclosed a dense polycrystalline silicon carbide body produced by hot pressing a particulate mixture of silicon carbide and beryllium carbide.

What is claimed is:

1. A method of producing an electrically conducting polycrystalline silicon carbide body which comprises providing a significantly uniform mixture of a submicron powder consisting essentially of β-silicon carbide, an amount of boron additive selected from the group consisting of boron and boron carbide equivalent to about 0.3% by weight to 3.0% by weight of boron based on said β-silicon carbide, about 0.1% by weight to 1.5% by weight of beryllium carbide based on said β-silicon carbide, and an amount of a carbonaceous additive selected from the group consisting of free carbon and a carbonaceous organic material equivalent to 0.1% by weight to 1.0% by weight of free carbon based on said β-silicon carbide, said carbonaceous organic material completely decomposing at a temperature ranging from about 50° C to 1000° C to yield said free carbon and gaseous product of decomposition, shaping the mixture into a green body, and sintering the green body at a temperature ranging from about 1850° C to 2300° C in a sintering atmosphere in which it is substantially inert at atmospheric pressure or below atmospheric pressure to produce a sintered body having a density of at least 85% of the theoretical density of silicon carbide.

2. A method of producing a polycrystalline silicon carbide body according to claim 1 wherein said sintering atmosphere is at atmospheric pressure.

3. An electrically conducting polycrystalline silicon carbide body comprised of a sintered body consisting essentially of silicon carbide, boron or boron and boron carbide, beryllium carbide and free carbon, said silicon carbide having a composition ranging from $\beta$-silicon carbide to a mixture of $\beta$- and $\alpha$-silicon carbides to $\alpha$-silicon carbide, said boron being present in an amount ranging from about 0.3% by weight to 3% by weight based on said silicon carbide, said boron being in solid solution with said silicon carbide or being in solid solution with said silicon carbide and also being present as grains of a boron carbide phase, said beryllium carbide being present in an amount ranging from about 0.1% by weight to 1.5% by weight based on said silicon carbide, a minor portion of said beryllium carbide being in solid solution with said silicon carbide with the remainder being in the form of grains of a beryllium carbide phase, said free carbon being in the form of particles substantially submicron in size and being present in an amount ranging from 0.1% by weight to 1% by weight based on said silicon carbide, said sintered body having a density of at least 85% of the theoretical density of silicon carbide.

4. An electrically conducting polycrystalline silicon carbide body according to claim 3 wherein said body has an electrical resistivity in air at room temperature ranging up to 100 ohm cm.

* * * * *